(12) United States Patent
Koone et al.

(10) Patent No.: US 11,341,311 B1
(45) Date of Patent: May 24, 2022

(54) GENERATION AND SELECTION OF UNIVERSALLY ROUTABLE VIA MESH SPECIFICATIONS IN AN INTEGRATED CIRCUIT

(71) Applicant: International Business Machines Corporation, Armonk, NY (US)

(72) Inventors: Joseph Koone, Poughkeepsie, NY (US); Smitha Reddy, Fishkill, NY (US); Gustavo Enrique Tellez, Hyde Park, NY (US); Michael Alexander Bowen, Poughkeepsie, NY (US); Adam P. Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/356,709

(22) Filed: Jun. 24, 2021

(51) Int. Cl.
*G06F 30/398* (2020.01)
*G06F 30/394* (2020.01)
*G06T 17/20* (2006.01)
*G06F 30/23* (2020.01)
*G06F 119/12* (2020.01)

(52) U.S. Cl.
CPC ............ *G06F 30/398* (2020.01); *G06F 30/23* (2020.01); *G06F 30/394* (2020.01); *G06T 17/20* (2013.01); *G06F 2119/12* (2020.01)

(58) Field of Classification Search
CPC .................................................. G06F 30/398
USPC .......................................................... 716/111
See application file for complete search history.

(56) References Cited

U.S. PATENT DOCUMENTS

| | | | |
|---|---|---|---|
| 6,523,156 | B2 | 2/2003 | Cirit |
| 6,951,007 | B2 | 9/2005 | Kaida |
| 7,240,314 | B1 | 7/2007 | Leung |
| 9,977,857 | B1 | 5/2018 | Ku et al. |
| 10,360,342 | B2 | 7/2019 | Ou et al. |
| 10,436,841 | B2 | 10/2019 | Bourstein et al. |
| 10,664,642 | B1 * | 5/2020 | Peyer .................... G06F 30/394 |
| 10,811,357 | B2 | 10/2020 | Lee et al. |

(Continued)

OTHER PUBLICATIONS

Anonymous "A Hybrid Solution of Structured and Customed ASIC Using the Metal Frame Standard Cell", IPCOM000171115D, May 29, 2008, pp. 1-5.

(Continued)

*Primary Examiner* — Eric D Lee
(74) *Attorney, Agent, or Firm* — Cantor Colburn LLP; Samuel Waldbaum (57) ABSTRACT

Aspects of the invention include generating a set of via mesh specifications for a cell within an integrated circuit. Each via mesh specification defines one or more straps on each layer above a first layer, which includes one or more pins that form a pin terminal, to a top layer that connects the cell to a net for interconnection of the cell with one or more other cells, and also one or more vias that interconnect adjacent ones of the layers. Aspects also include verifying whether each via mesh specification is a universally routable via mesh specification guaranteeing that the cell interconnects with other cells through the net while meeting all design rules, and including only the via mesh specifications of the set of via mesh specifications that are universally routable in a library of via mesh specifications. The library is used to finalize and fabricate the integrated circuit.

20 Claims, 9 Drawing Sheets

(56) References Cited

U.S. PATENT DOCUMENTS

2018/0165403 A1  6/2018  Wang et al.
2019/0148290 A1  5/2019  Ku et al.
2021/0066232 A1  3/2021  May et al.

OTHER PUBLICATIONS

Chen et al., "Physical Planning of On-Chip Interconnect Architectures", Proceedings of the 2002 IEEE International Conference on Computer Design, pp. 1-6.

\* cited by examiner

GENERATION AND SELECTION OF UNIVERSALLY ROUTABLE VIA MESH SPECIFICATIONS IN AN INTEGRATED CIRCUIT

BACKGROUND

The present invention generally relates to integrated circuit development, and more specifically, to the generation and selection of universally routable via mesh specifications in an integrated circuit.

The development of an integrated circuit (i.e., chip) involves several stages from design through fabrication. Some aspects of the development are performed iteratively to ensure that the chip that is ultimately manufactured meets all design requirements. In addition, aspects of the design may be performed in a hierarchical manner. An exemplary organization of a chip is as a set of interconnected cells. Each cell includes a number of interconnected components that allow the cell to serve a specific function (e.g., OR gate, NAND gate). Cells may be standard cells selected from a library to perform a specific function.

The interconnection of cells is through wires routed over multiple levels (i.e., metal layers) with vias (i.e., vertical interconnections) facilitating connections among the stacked metal layers. Timing of the chip may be improved by using higher level metal layers that can carry thicker metal wires. However, this timing improvement must be balanced with the increased density that would result from routing too many interconnections at higher metal layers. This is because increased density increases interference and negatively affects chip performance. Each cell may have different pin layouts and different placement options in relation to the power grid of the particular chip. Placement refers to the particular location within the chip and affects routability. Routing refers to the path (e.g., wire widths, metal layers) used for the interconnection. A cell is not routable if, based on a particular placement, it cannot be interconnected with other cells in a way that meets timing, power, and other requirements.

SUMMARY

Embodiments of the present invention are directed to systems and methods to generate and select universally routable via mesh specifications during integrated circuit development. A non-limiting example computer-implemented method includes generating a set of via mesh specifications for a cell within an integrated circuit. Each via mesh specification defines one or more straps on each layer above a first layer, which includes one or more pins that form a pin terminal, to a top layer that connects the cell to a net for interconnection of the cell with one or more other cells, and each via mesh specification also includes one or more vias that interconnect adjacent ones of the layers. The computer-implemented method also includes verifying whether each via mesh specification in the set of via mesh specifications is a universally routable via mesh specification, the universally routable via mesh specification guaranteeing that the cell interconnects with other cells through the net while meeting all design rules, and including only the via mesh specifications of the set of via mesh specifications that are universally routable via mesh specifications in a library of via mesh specifications. The library of via mesh specifications is used to finalize and fabricate the integrated circuit.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, the cells that make up a chip are interconnected to perform the overall functionality of the chip. Each cell involves an interconnection of components that, together, perform the function of that cell (e.g., multiplication, AND gate). A via mesh provides multiple conductive pathways from one or more points in one layer to one or more points in another layer. At the first level, the via mesh includes interconnected shapes (i.e., wires and vias) that connect to a pin terminal comprised of a single pin or a set of disjoint pins that are logically treated as one pin. On each subsequent layer, one or more straps, which are conductive strips, form conductive pathways that are connected to straps on adjacent layers through one or more vias. While the straps within a layer are oriented parallel to each other, the straps of adjacent layers may be oriented in a different (e.g., orthogonal) direction relative to each other or may be parallel. A router that connects one or more pins of the cell to pins of other cells, which may or may not include a via mesh, only connects to the strap at the highest level of the via mesh. The number of layers from the one or more pins to the highest level defines the height of the via mesh. The redundancy afforded by the straps and vias results in a reduction in resistance of the connection from the one or more pins to the upper layers. The number of straps and vias determines the resistance. A decrease in resistance is referred to as an increase in strength of the via mesh.

Embodiments of the invention relate to the generation and selection of universally routable via mesh specifications for an integrated circuit. A via mesh specification provides a via mesh router with the required number of straps and vias for each metal layer of the cell. That is, a via mesh specification defines the via mesh structure and indicates the via mesh height. A given cell may have more than one via mesh specification associated with it, and each via mesh specification may offer a different resistance and corresponding strength.

Prior approaches to generating one or more via mesh specifications for a cell do not consider universal routability. A universally routable via mesh specification refers to one that has a viable route regardless of the placement of the cell within the integrated circuit. Thus, according to a prior approach, a via mesh specification selected from a library may not have a viable route based on the placement of the cell and design rules established for the chip. As detailed herein cells with similar characteristics are grouped together, and via mesh specifications for the group are guaranteed to be routable regardless of placement. Thus, a particular via mesh with a particular height and strength may be selected according to a corresponding via mesh specification, from among the via mesh specifications in the library, based on timing and other requirements without a possibility of routing issues for the selected via mesh specification.

As also detailed, selection of one of the via mesh specifications may be made based on the timing needs of the interconnect wires outside the via mesh (i.e., the net) in addition to the resistance capacitance (RC) table associated with each via mesh specification. In particular, the naming convention of pin constraints, which are already in use by prior routing tools, is modified to indicate via mesh strength in addition to net characteristics. Thus, assignment of a pin constraint by the routing tool corresponds with selection of a via mesh specification among available universally routable via mesh specifications in the library for the cell type.

Figure 1:
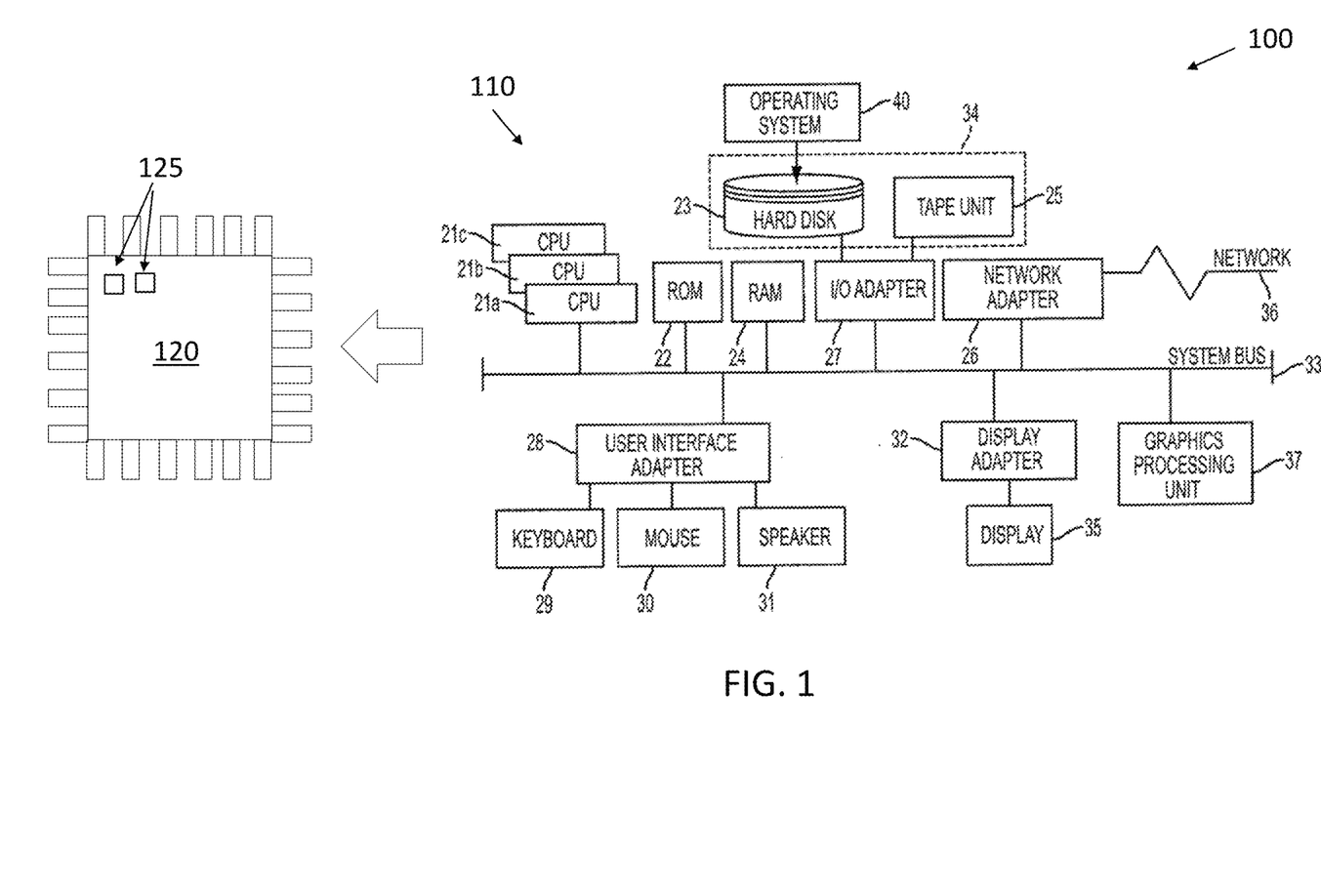
FIG. 1 is a block diagram of a system to perform the generation and selection of universally routable via mesh specifications in the development of an integrated circuit according to one or more embodiments.

FIG. 1 is a block diagram of a system 100 to perform the generation and selection of universally routable via mesh specifications in the development of an integrated circuit 120 according to one or more embodiments. The various metal layers 205 (FIG. 2) that make up the integrated circuit 120 are not shown in FIG. 1. Exemplary cells 125 that make up the integrated circuit 120 are indicated. The system 100 includes a processing system 110 used to generate the design that is ultimately fabricated into the integrated circuit 120. The steps involved in the fabrication of the integrated circuit 120 are well-known and briefly described herein. Once the physical layout is finalized, based, in part, on selection of a via mesh specification among universally routable via mesh specifications developed according to embodiments of the invention, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 9.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2A:
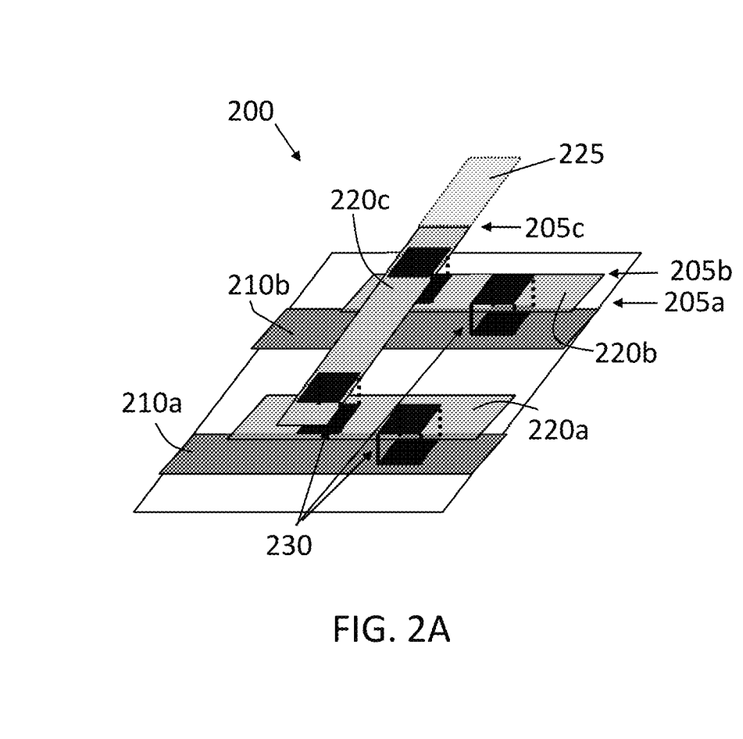
FIG. 2A shows a three-dimensional representation of the via mesh that is generated according to one or more embodiments of the invention.
Figure 2B:
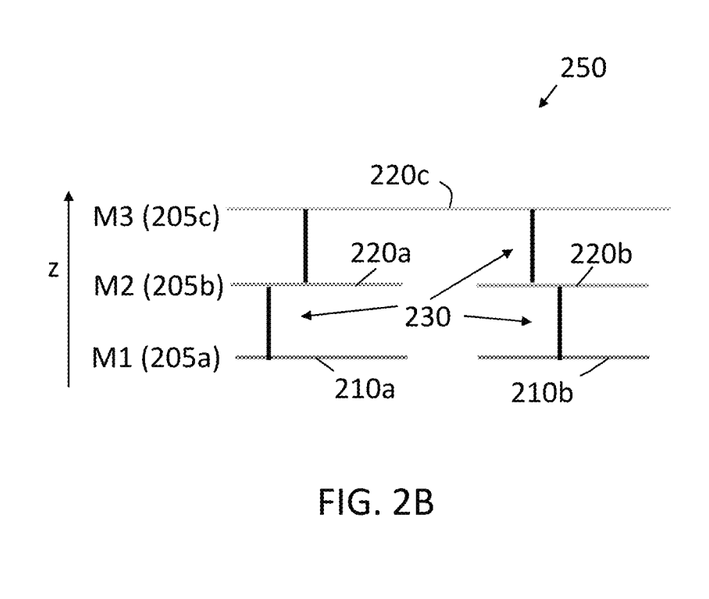
FIG. 2B shows a representation of a via mesh specification that is generated for the exemplary via mesh shown in FIG. 2A according to one or more embodiments of the invention.

FIGS. 2A and 2B illustrate an exemplary via mesh 200 for an exemplary cell 125 and a corresponding representation associated with the via mesh specification 250 that is generated according to one or more embodiments of the invention. FIG. 2A shows a three-dimensional representation of the via mesh 200. Pins 210a, 210b (generally referred to as 210) are shown on the first layer 205a (generally referred to as 205). Straps 220a, 220b (generally referred to as 220) are shown on the second layer 205b. As FIG. 2A indicates, the pins 210 and straps 220 are parallel and a via 230 connects each pin 210 to a corresponding strap 220. As previously noted, the pins 210 and straps 220 on adjacent layers may be oriented differently (e.g., orthogonal), instead. Another strap 220c is shown at the third layer 205c, which is the top layer of the exemplary via mesh structure 200. The strap 220c on the third layer 205c is orthogonal to the straps 220a, 220b on the second layer 205b. The number of layers 205 defines the height of the via mesh 200.

Figure 6:
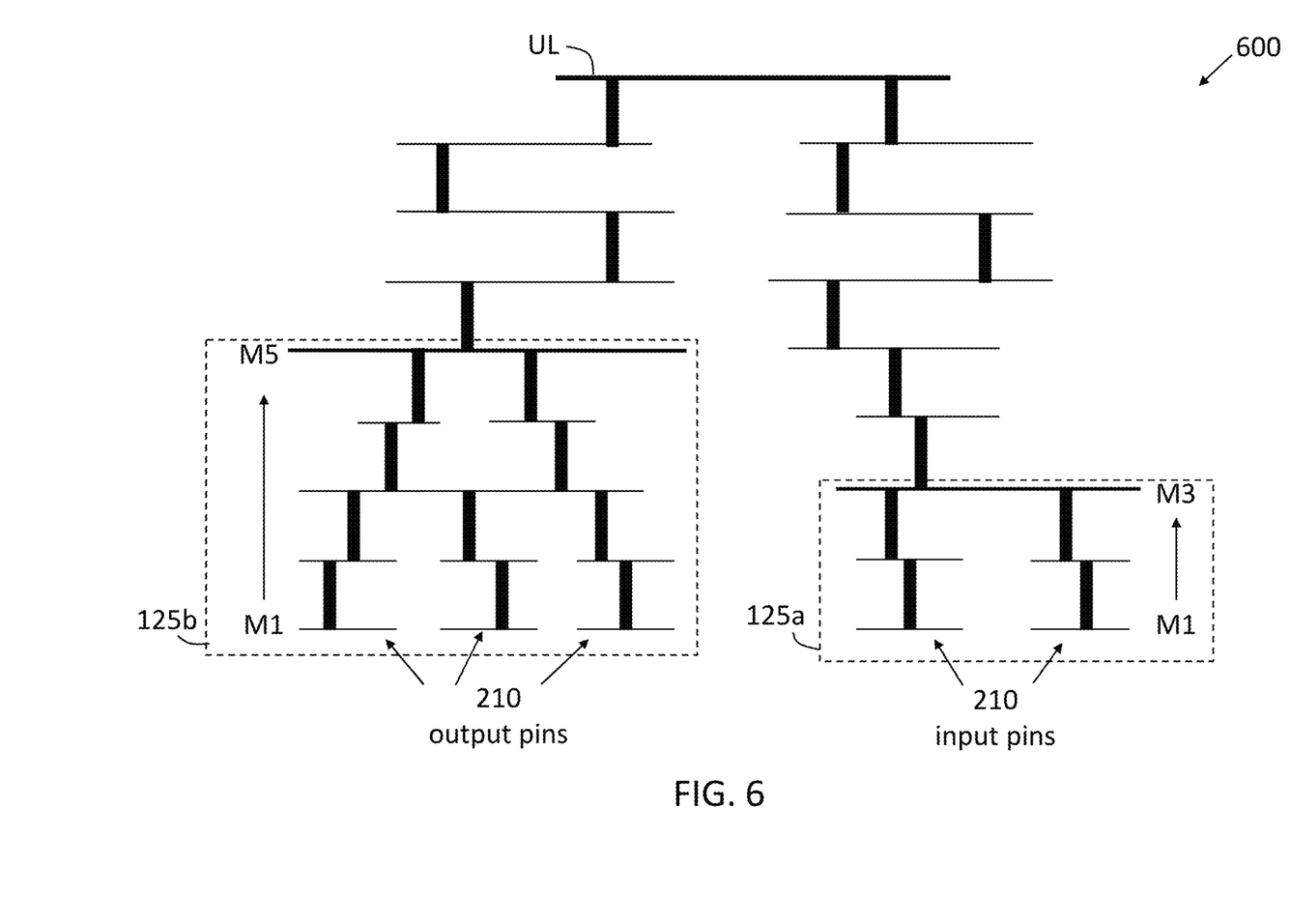
FIG. 6 shows an exemplary net that forms a logical connection between the input pins of one cell and the output pins of another cell according to exemplary embodiments of the invention.

Vias 230 facilitate a connection between the pins 210 on the first layer 205a and the straps 220a and 220b on the second layer 205b and additional vias facilitate a connection between each of the straps 220a and 220b on the second layer 205b and the strap 220c at the third layer 205c. The straps 220 and vias 230 make up the via mesh 200. A routing tool, referred to as a router, connects the pins 210 of the cell 125, through the via mesh 200 of the cell 125, to one or more other cells 125 through a net 600 (FIG. 6). Specifically, the router connects the cell 125 to the net 600 only at the top level 205 (i.e., the third layer 205c in the example shown) at the access 225. As previously noted, the via mesh 200 (e.g., the straps 220 and vias 230) provides redundancy in the connection from the net 600 to the pins 210. Increased redundancy is proportional to increased strength of the via mesh 200 and decreased resistance.

FIG. 2B shows a representation of a via mesh specification 250 that is generated for the exemplary via mesh 200 shown in FIG. 2A according to one or more embodiments of the invention. The via mesh specification 250 defines the structure of the via mesh 200 and provides the router with wire and via counts for each layer 205. The exemplary via mesh specification 250, as represented in FIG. 2B, indicates that there are two pins 210 on the first layer 205a (i.e., metal layer 1 (M1)) that are connected by respective vias 230 to two straps 220 on the second layer 205b (i.e., metal layer 2 (M2)). Additional vias 230 allow a strap 220c on the third layer 205c (i.e., metal layer 3 (M3)) to connect to both straps 220 on the second layer 205b and, thereby, to both pins 210 on the first layer 205a. The number of straps 220 (2) on M2 and the number of straps 220 (1) on M3 may be used to represent the via mesh specification 250 as {2,1}. This indicates the number of metal layers and, thus, the height of the via mesh 200 as being 3, and also specifies the number of straps 220 on the second and every subsequent layer 205.

As previously noted, exemplary embodiments of the invention relate to generating a library of via mesh specifications 250 that are each guaranteed to be routable regardless of the placement of the cell 200. This routability is further discussed with reference to FIGS. 3-5.

Figure 3:
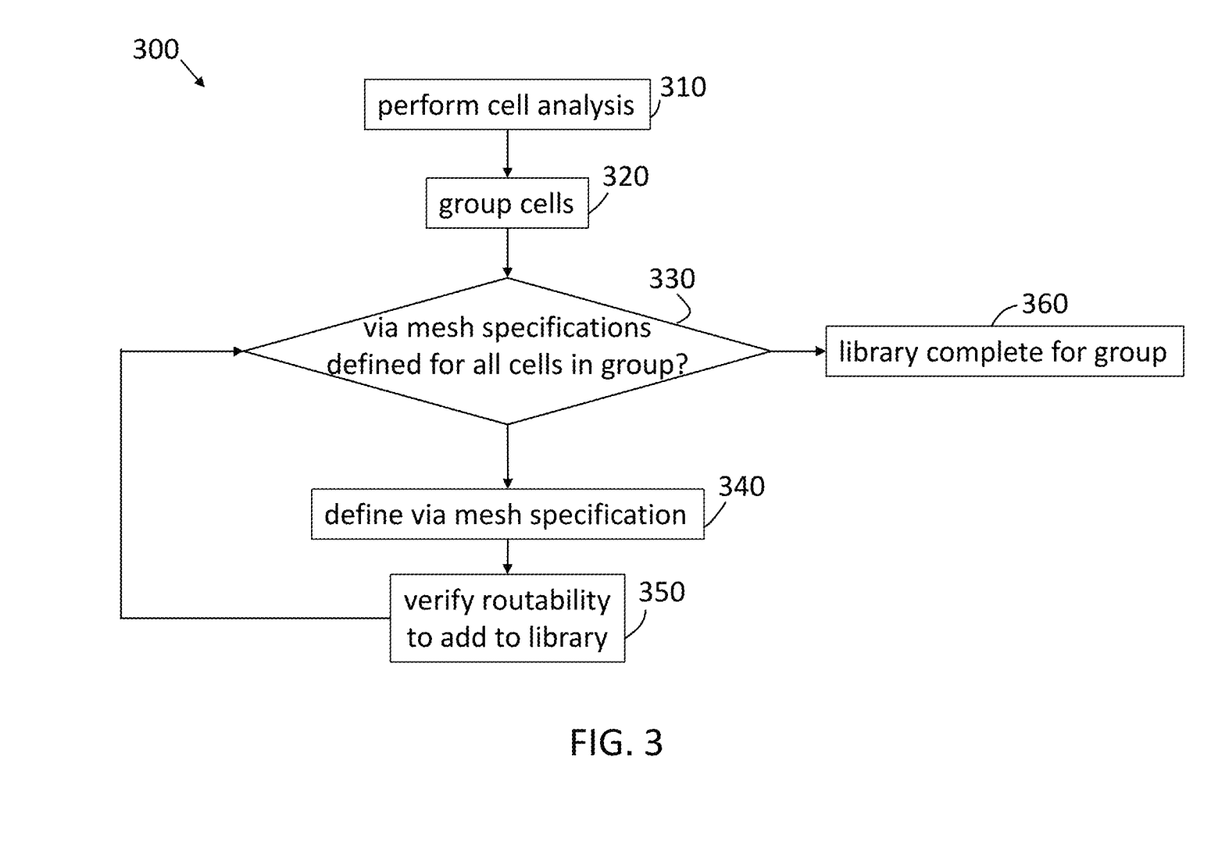
FIG. 3 is a process flow of a method of generating via mesh specifications according to embodiments of the invention.

FIG. 3 is a process flow of a method 300 of generating universally routable via mesh specifications 250 according to embodiments of the invention. At block 310, performing cell analysis refers to gathering statistics for each cell 200 including the number of input terminals, the number of input pins 210, the number of output terminals, the number of output pins 210, the cell width, and the cell height. A pin terminal refers to the logical representation of one or more pins 210. That is, a pin terminal may represent a single pin 210 or a disjoint set of pins 210 that are logically treated as one. At block 320, grouping cells 125 may be based on different cell statistics. For example, cells 125 may be grouped according to the number of output pins 210 versus the cell height, the number of input pins 210 versus the cell height, or the number of output terminals versus the number of input terminals. At block 330, a determination is made whether via mesh specifications 250 were defined for the group in consideration of all the cells 125 of the group. If so, then the method 300 ends at block 360 with a complete library of via mesh specifications 250 that are compatible with any of the cells 200 of the group. If not, the processes at blocks 340 and 350 are performed iteratively, as indicated.

At block 340, defining a via mesh specification 250 includes obtaining a resistance estimation for each via mesh specification 250 that is generated. The maximum strength via mesh 200 may be created for each group of cells 125 and lower strength options for the via mesh 200 may then be derived. At block 350, verifying routability results in only universally routable (i.e., routable regardless of placement) via mesh specifications 250 being retained in the library. Routability refers to the cell 125 being interconnectable to other cells 125 through a net 600 while meeting all design rules. Generally, individual placement and packed placement scenarios are considered for each cell 125, as further discussed with reference to FIGS. 4 and 5. Any via mesh 200 that is deemed not to be universally routable is eliminated from the via mesh specification library entries for the group of cells 125.

As FIG. 3 indicates, defining via mesh specifications (at block 340) and verifying routability (at block 350) are performed iteratively until all via mesh options for all cells 125 of a group are considered. The routability determination does not require actual layout of a given via mesh 200. Thus, a large number of via mesh options with a variety of strengths and heights may be tested for routability according to one or more embodiments of the invention. Only via mesh specifications 250 that are routable regardless of placement are retained in the library (at block 360).

Figure 4:
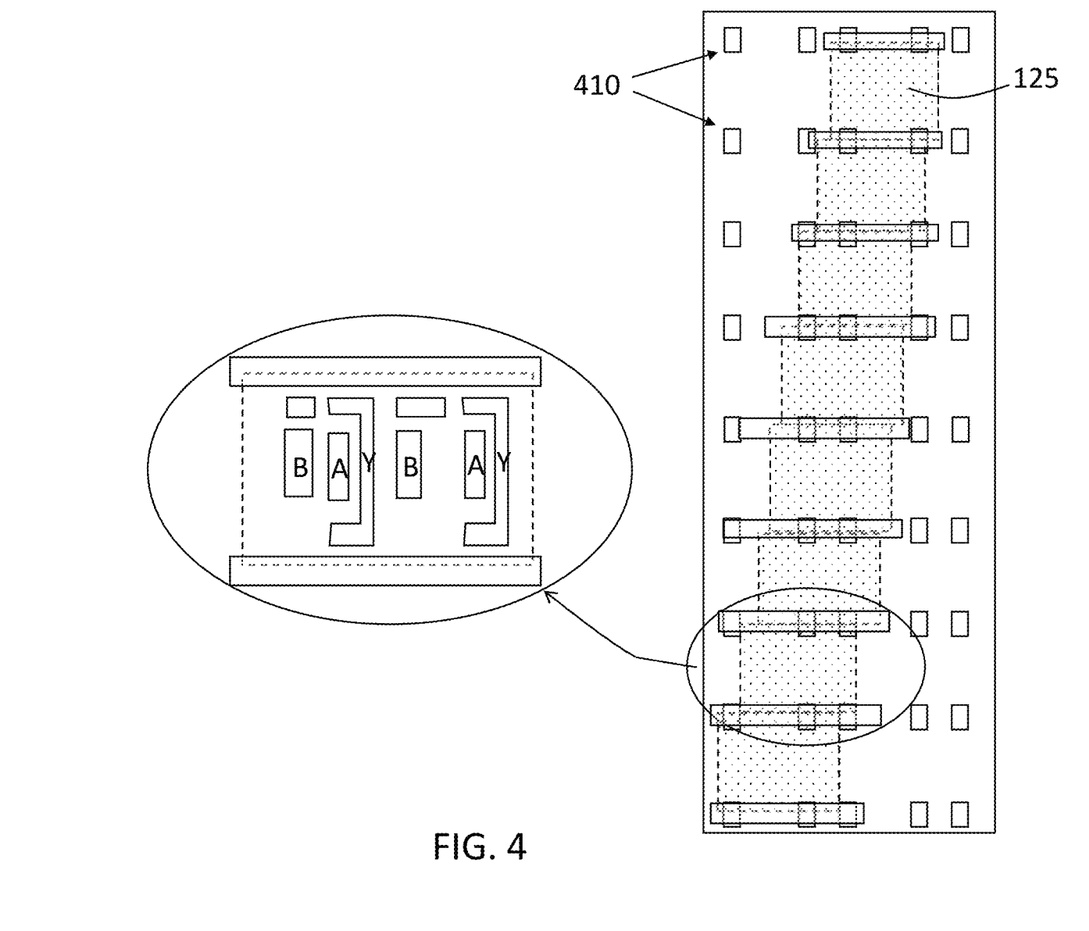
FIG. 4 illustrates aspects of routing analysis for an exemplary cell according to one or more embodiments of the invention.

FIG. 4 illustrates aspects of routing analysis, as part of the processing at block 350, for an exemplary cell 125 according to one or more embodiments of the invention. The statistics of the exemplary cell 125 include an input terminal count of two, two input pins 210 with shape A, two input pins 210 with shape B, an output terminal count of one, and one output pin 210 with shape Y. The cell width may be 480 nanometers (nm) and the cell height may be 324 nm, for example. These statistics may result in the exemplary cell 125 being grouped with certain other cells 125. As illustrated, test cases are created with every placement of the cell 125 with respect to the M2 (i.e., metal layer 2) grid of power staples 410. That is, a given via mesh option for a given cell 125 is repeated at each potential placement, as shown.

Routing tracks and design rules are analyzed to determine the free tracks in each layer 205. Because multiple via meshes 200 can be built for each cell 125, available resources are divided between all the cell via mesh strap counts.

The process of testing routability at different placements is repeated for each cell 125 and each potential via mesh 200 for the cell 125 of the group. The number of positions to be tested is computed as the pitch of the power staple grid 410 divided by the placement pitch (i.e., pitch of the placement grid). The result of the computation and, thus, the number of placements at which each via mesh 200 must be tested may vary based on the particular chip technology. As previously noted, the process does not require actual preconstruction of any of the via meshes 200. Instead, the different placement options manifest as a different allocation of routing resources with respect to the power grid. Based on the process, limitations on placement are found for each cell 125 in a group. That is, if a given cell 125 with a given via mesh 200 cannot be placed in all of the positions shown in FIG. 4 in compliance with design rules, then that via mesh specification 250 for the via mesh 200 is not added to the library (at block 360) for the group. In this way, the placement limitations of any via mesh 200 of any cell 125 are imputed to all cells 125 of the group.

Figure 5:
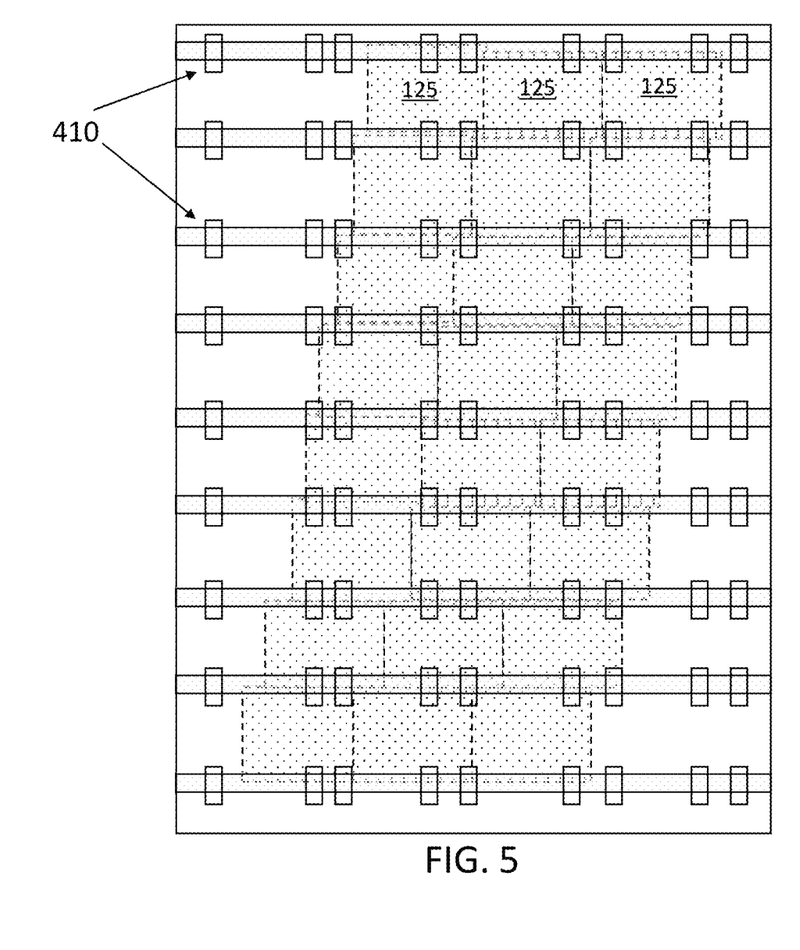
FIG. 5 illustrates aspects of routing analysis for an exemplary cell according to one or more embodiments of the invention.

FIG. 5 illustrates aspects of routing analysis, as part of the processing at block 350, for an exemplary cell 125 according to one or more embodiments of the invention. While FIG. 4 illustrates different placements relative to the M2 power staple grid 410, FIG. 5 illustrates a packed placement scenario. The via meshes 200 that are found to be routable according to the placements shown in FIG. 4 are further considered in this packed placement scenario which involves the cell 125 being replicated as indicated. In the packed placement scenario, the cell 125 with the via mesh 200 being tested is constrained not only by the power staples 410 but also by neighboring via meshes 200. A via mesh 200 is not routable if the router fails to insert the required wire or via counts. If the reason for a routing failure is fundamental to the via mesh 200 design, then the corresponding via mesh specification 250 cannot be included in the library at block 360. As a result of the routing analysis at block 350, any via mesh specification 250 included in the library (at block 360) for a group of cells 125 is universally routable (i.e., routable regardless of its placement).

FIG. 6 shows an exemplary net 600 that forms a logical connection between the input pins 210 of one cell 125a and the output pins 210 of another cell 125b according to exemplary embodiments of the invention. The exemplary cells 125a and 125b are both shown with representations of via mesh specifications 250. However, only one of the cells 125 may have a via mesh 200 according to alternate embodiments of the invention. A wire code (WC) indicates constraints that are placed on the net 600. The WC may indicate minimum wire width and spacing, for example. The width is based on timing criticality, with more critical nets having a higher minimum wire width. The use layer (UL) is a constraint on the net 600 that indicates the longest wire and the one that interconnects the two portions of the net 600 that each connect to one of the cells 125a, 125b, as indicated. The UL may be a range of layers 205 or a single layer 205, as shown in the exemplary case. The UL is generally at a higher layer 205 based on increased timing criticality of a net 600.

As FIG. 6 illustrates, connecting input pins 210 of one cell 125a with output pins 210 of another cell 125b requires not only the net 600 but also the via mesh 200 of one or both of the cells 125. The via mesh 200 for a cell 125 is selected from among the available universally routable via mesh specifications 250 that are generated according to one or more embodiments of the invention and stored in the library for the group to which the cell 125 belongs. The selected via mesh 200 must be suited to the net 600 in consideration of both timing and routing congestion. As further discussed with reference to FIGS. 7 and 8, the pin terminal constraints, referred to as pin constraints 760 (FIG. 7) and created to indicate net specifications, may be modified to also indicate the via mesh specification 250 to be selected from the library according to one or more embodiments of the invention. That is, each pin constraint 760 includes information pertaining to a corresponding via mesh specification 250. That corresponding via mesh specification 250 may or may not be among the universally routable via mesh specifications 250 in the library that is populated at block 360, as further discussed with reference to FIG. 8.

Figure 7:
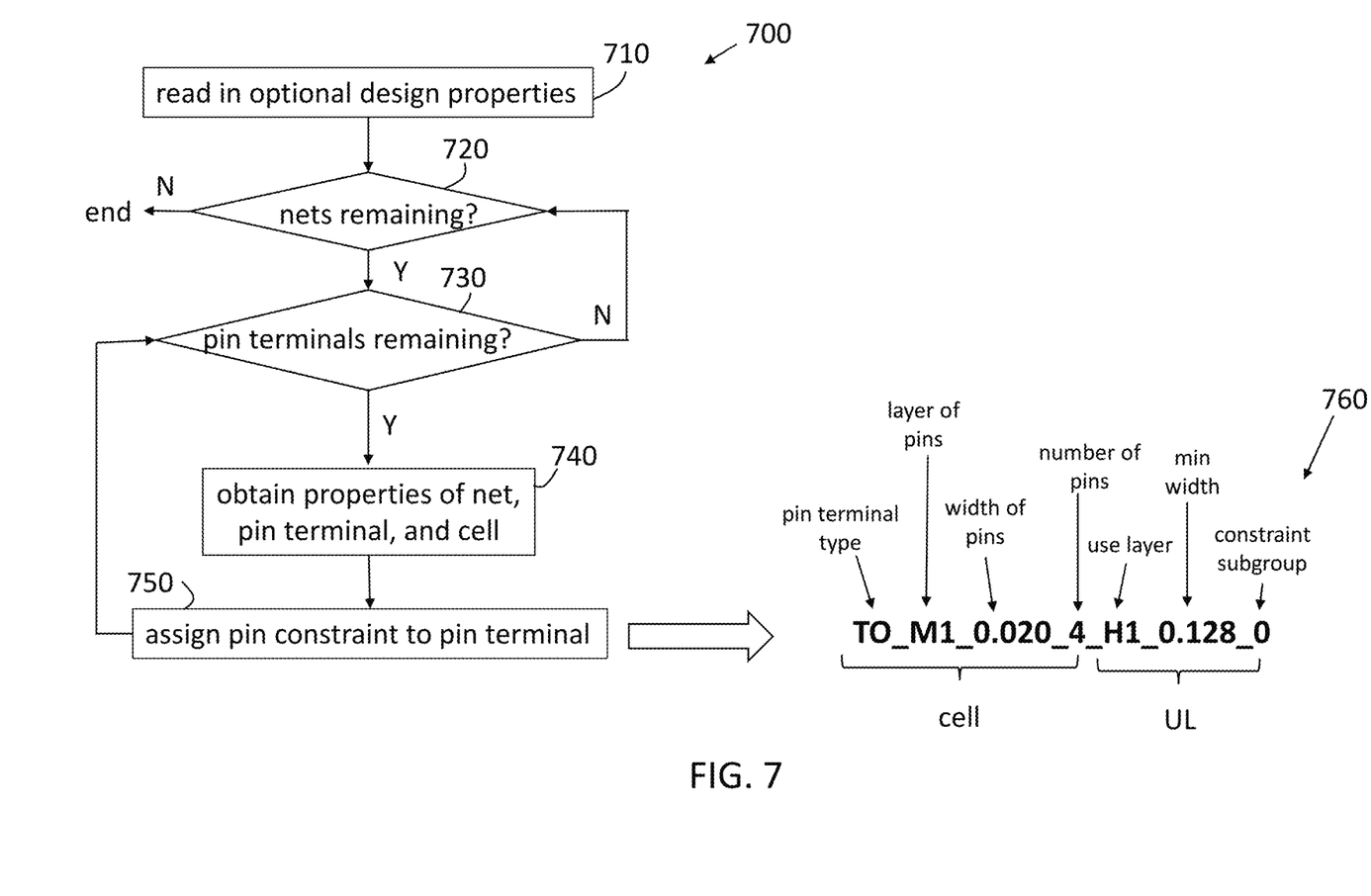
FIG. 7 is a process flow of a method of assigning pin constraints that facilitate selection from among universally routable via mesh specifications according to one or more embodiments of the invention.

FIG. 7 is a process flow of a method 700 of assigning pin constraints 760 that facilitates selection from among universally routable via mesh specifications 250 according to one or more embodiments of the invention. Once the structure of the net 600 is defined, the processes shown in FIG. 7 may be performed at any time. At block 710, reading in optional design properties refers to design properties that may limit the strength of the via mesh 200 that may be used. At block 720, a check is done of whether nets 600 that interconnect cells 125 remain without already having been processed to assign pin constraints 760. If not, then the process flow is completed, as indicated. If the check at block 720 indicates that there is at least one net 600 that has not yet been processed, the check at block 730 is performed. At block 730, if it is determined if pin terminals (i.e., one or a set of pins 210) remain without an assignment of a pin constraint 760. If not, then the check at block 720 is repeated. If there is at least one pin terminal without an assignment of a pin constraint 760, then the processes at block 740 are performed.

At block 740, the processes include obtaining properties of the net 600, the pin terminal, and the cell 125. Assigning a pin constraint 760 to the pin terminal, at block 750, refers to selecting from an existing look up table of pin constraints 760. The table of pin constraint 760 is predefined along with a corresponding table of resistance and capacitance (RC) entries.

An exemplary pin constraint 760 is shown. As indicated, the pin constraint 760 is modified from prior pin constraint naming conventions such that cell properties are encoded in the name along with net 600 and, more specifically, UL properties. The properties of the cell 125 that are part of the pin constraint 760 include the pin terminal type (i.e., input or output), the layer of the pins 210 (e.g., the first metal layer, M1), the width of the pins 210 (e.g., in micrometers (microns)), and the number of pins 210 (i.e., the number of must-connect pins). The properties of the UL that are part of the pin constraint 760 include the layer 205 identification, the minimum width according to the wire code at the UL, and the constraint subgroup property (e.g., 0, 1, 2) according to the wire code, which indicates the strength of the via mesh 200 for the cell 125.

Figure 8:
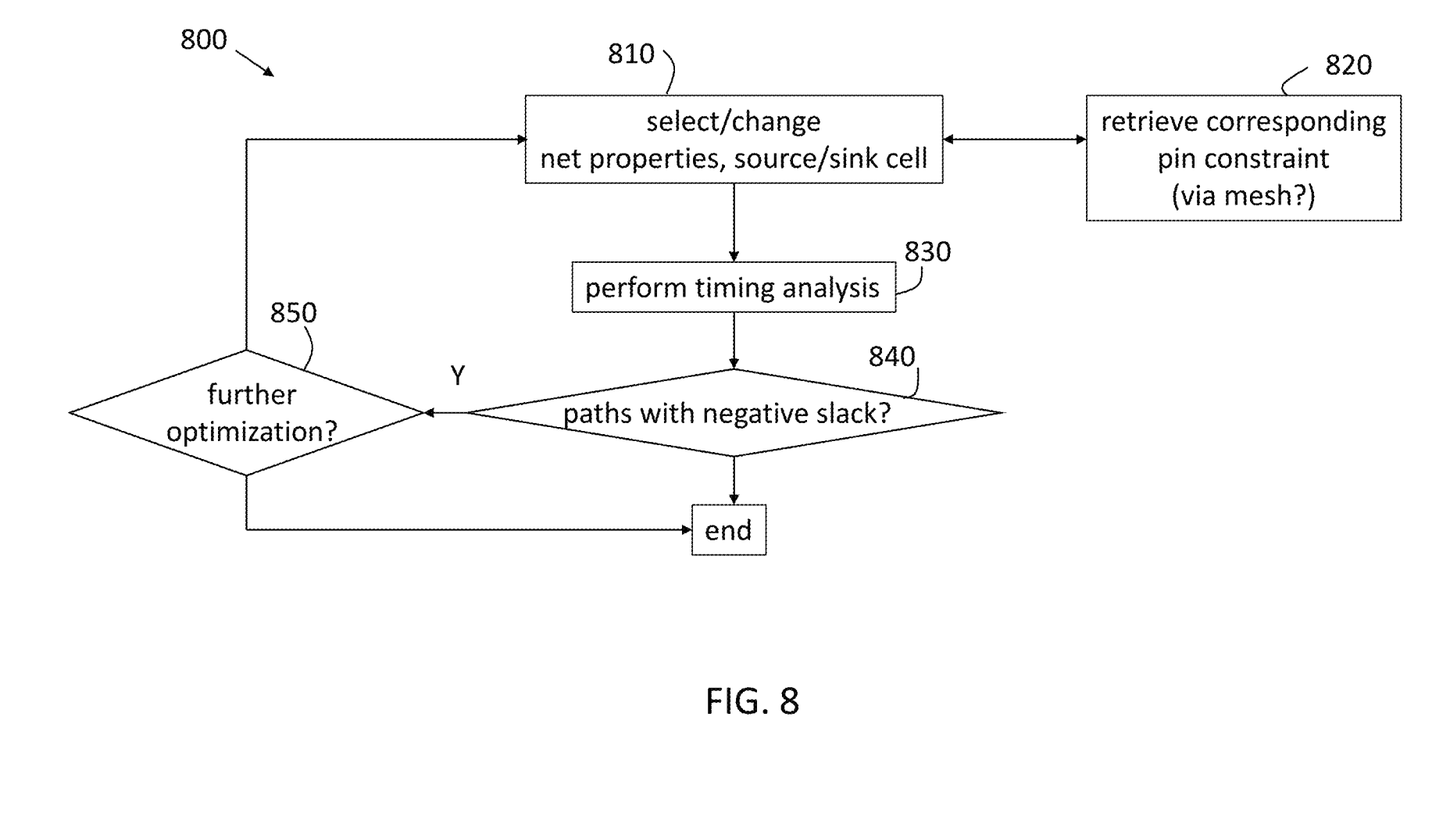
FIG. 8 is a process flow of a method of selecting a via mesh as part of an optimization process according to one or more embodiments of the invention.

As previously noted, the processes shown in FIG. 7 may be performed at any time. The pin constraint 760 that is assigned at block 750 may not correspond with a via mesh specification 250 that is part of the library of universally routable via meshes 200. For example, none of the via meshes 200 may be compatible with a width of the pins 210 that is 0.020 microns. FIG. 8 describes the processes involved in optimizing a design of the integrated circuit 120. When the pin constraint 760 corresponding with a selected net 600 has a corresponding universally routable via mesh 200 based on the library entries, then the optimization process benefits from improved accuracy in timing analysis, as discussed.

FIG. 8 is a process flow of a method 800 of selecting a universally routable via mesh 200 as part of an optimization process according to one or more embodiments of the invention. The optimization process refers to the process of adjusting the design of the integrated circuit 120 iteratively to ensure that timing requirements are met. At block 810, the processes include selecting or changing the properties of the net 600 and/or the source or sink cell 125 (i.e., the cell 125 with the input or output terminals). These selections define the properties that make up the pin constraint 760, as indicated in FIG. 7.

At block 820, retrieving a pin constraint 760 that corresponds with the properties selected at block 810 includes determining if that pin constraint 760 corresponds with a universally routable via mesh specification 250 from the library. Retrieving the pin constraint 760 is based on matching the specifications defined at block 810 based on the nomenclature of the pin constraints 760 that is discussed with reference to FIG. 7. This same nomenclature also allows a determination of whether there is a match with a universally routable via mesh specification 250 stored in the library, as also discussed with reference to FIG. 7. If the pin constraint 760 that is retrieved at block 820 does not have a corresponding universally routable via mesh specification 250, then the pin terminals of the cell 125 are connected to the top layer without the redundancy and corresponding decrease in resistance provided by a via mesh 200. The exemplary embodiment, in which the pin constraint 760 retrieved at block 820 has a corresponding via mesh specification 250 in the library, is considered. In this case, the timing analysis at block 830 is improved, as discussed.

At block 830, performing timing analysis includes considering the via mesh 200, unlike prior optimization processes. This is because, rather than global routes, a specific via mesh 200 and corresponding resistance and capacitance (RC) entry may be used in the timing analysis. A check is done, at block 840, of whether some paths have negative slack (i.e., timing that does not meet the requirement). If so, then a check is done, at block 850, of whether another optimization iteration may be added. If so, then the processes beginning at block 810 are repeated. If the check at block 840 indicates that none of the paths have negative slack (i.e., all paths meet timing requirements) or if another optimization is not possible according to the check at block 850, then the processes end.

The approach to via mesh 200 generation and selection according to one or more embodiments of the invention holds several advantages over prior approaches. As discussed with reference to FIGS. 3-5, the generation considers routability without requiring actual preconstruction of via mesh options that are considered. As a result, any via mesh specification 250 that is obtained from the library for cells 125 within a given group is guaranteed to be routable regardless of the placement of the cell 125. In addition, the modification of the pin constraint 760 facilitates selection (when available) of a particular via mesh specification 250 from the library in accordance with the assigned pin constraint 760. This ensures that the via mesh 200 and the net 600 meet all design requirements. Still further, the optimization process that results in the final assignment of the pin constraints takes into account the timing of the via mesh 200 and thereby provides additional granularity in the analysis.

Figure 9:
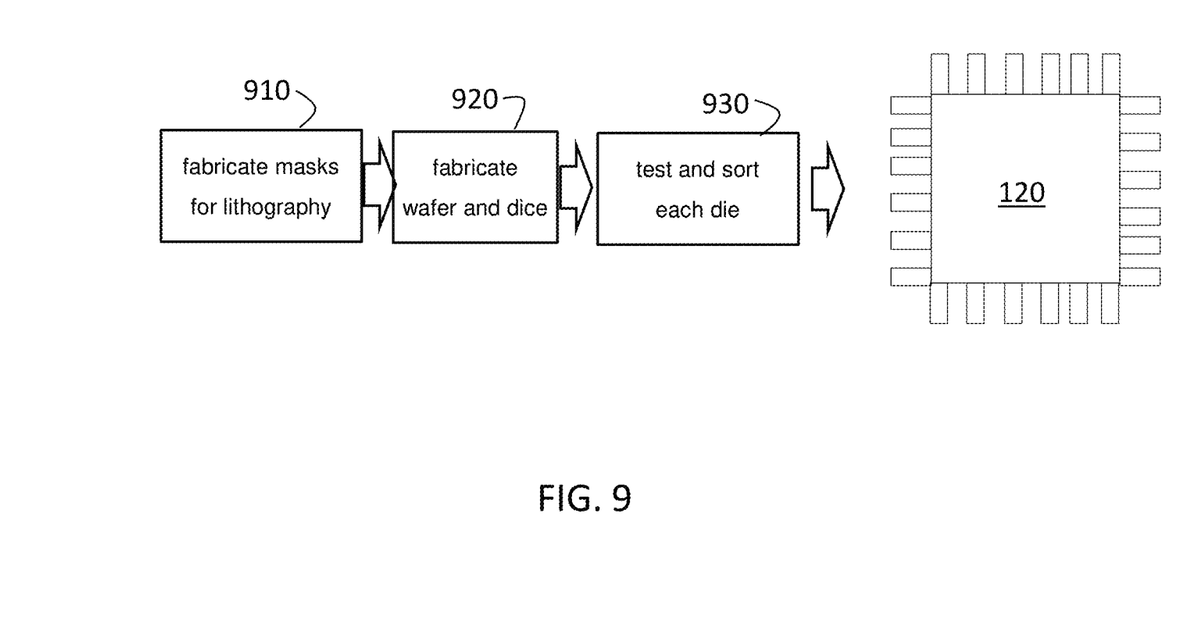
FIG. 9 is a process flow of a method of fabricating the integrated circuit according to exemplary embodiments of the invention.

FIG. 9 is a process flow of a method of fabricating the integrated circuit according to exemplary embodiments of the invention. Once the physical design data is obtained, based, in part, on the processes discussed with reference to FIGS. 3, 7, and 8, the integrated circuit 120 can be fabricated according to known processes that are generally described with reference to FIG. 6. Generally, a wafer with multiple copies of the final design is fabricated and cut (i.e., diced) such that each die is one copy of the integrated circuit 120. At block 910, the processes include fabricating masks for lithography based on the finalized physical layout. At block 920, fabricating the wafer includes using the masks to perform photolithography and etching. Once the wafer is diced, testing and sorting each die is performed, at block 930, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, using a processor, a set of via mesh specifications for a cell within an integrated circuit, each via mesh specification defining one or more straps on each layer above a first layer, which includes one or more pins that form a pin terminal, to a top layer that connects the cell to a net for interconnection of the cell with one or more other cells, and each via mesh specification also including one or more vias that interconnect adjacent ones of the layers;
verifying, using the processor, whether each via mesh specification in the set of via mesh specifications is a universally routable via mesh specification, the universally routable via mesh specification guaranteeing that the cell interconnects with other cells through the net while meeting all design rules; and
including, by the processor, only the via mesh specifications of the set of via mesh specifications that are universally routable via mesh specifications in a library of via mesh specifications, wherein the library of via mesh specifications is used to finalize and fabricate the integrated circuit.

2. The computer-implemented method according to claim 1, further comprising grouping the cell in a cell group with one or more other cells based on statistics of the cell.

3. The computer-implemented method according to claim 2, further comprising adding the universally routable via mesh specifications obtained for the other cells of the cell group to the library of via mesh specifications.

4. The computer-implemented method according to claim 1, wherein the verifying whether each via mesh specification is the universally routable via mesh specification includes testing whether a routing of the via mesh adheres to design requirements at each position in the cell.

5. The computer-implemented method according to claim 4, wherein the verifying whether each via mesh specification is the universally routable via mesh specification includes testing whether a routing of adjacent copies of the via mesh adheres to the design requirements at each position.

6. The computer-implemented method according to claim 1, further comprising assigning a pin constraint to each pin terminal, a nomenclature of the pin constraint indicating cell properties and net properties.

7. The computer-implemented method according to claim 6, further comprising performing timing optimization by making a selection of net properties, a source cell, and a sink cell, obtaining the pin constraint that corresponds with the net properties and the source cell or the sink cell, obtaining a corresponding universally routable via mesh specification from the library of via mesh specifications based on the nomenclature of the pin constraint, and performing timing analysis, where the timing analysis includes timing of the universally routable via mesh specification.

8. A system comprising:
a memory having computer readable instructions; and
one or more processors for executing the computer readable instructions, the computer readable instructions controlling the one or more processors to perform operations comprising:
generating a set of via mesh specifications for a cell within an integrated circuit, each via mesh specification defining one or more straps on each layer above a first layer, which includes one or more pins that form a pin terminal, to a top layer that connects the cell to a net for interconnection of the cell with one or more other cells, and each via mesh specification also including one or more vias that interconnect adjacent ones of the layers;
verifying whether each via mesh specification in the set of via mesh specifications is a universally routable via mesh specification, the universally routable via mesh specification guaranteeing that the cell interconnects with other cells through the net while meeting all design rules; and including only the via mesh specifications of the set of via mesh specifications that are universally routable via mesh specifications in a library of via mesh specifications, wherein the library of via mesh specifications is used to finalize and fabricate the integrated circuit.

9. The system according to claim 8, wherein the operations further include grouping the cell in a cell group with one or more other cells based on statistics of the cell.

10. The system according to claim 9, wherein the operations further include adding the universally routable via mesh specifications obtained for the other cells of the cell group to the library of via mesh specifications.

11. The system according to claim 8, wherein the verifying whether each via mesh specification is the universally routable via mesh specification includes testing whether a routing of the via mesh adheres to design requirements at each position in the cell.

12. The system according to claim 11, wherein the verifying whether each via mesh specification is the universally routable via mesh specification includes testing whether a routing of adjacent copies of the via mesh adheres to the design requirements at each position.

13. The system according to claim 8, wherein the operations further include assigning a pin constraint to each pin terminal, a nomenclature of the pin constraint indicating cell properties and net properties.

14. The system according to claim 13, wherein the operations further include performing timing optimization by making a selection of net properties, a source cell, and a sink cell, obtaining the pin constraint that corresponds with the net properties and the source cell or the sink cell, obtaining a corresponding universally routable via mesh specification from the library of via mesh specifications based on the nomenclature of the pin constraint, and performing timing analysis, where the timing analysis includes timing of the universally routable via mesh specification.

15. A computer program product comprising a computer readable storage medium having program instructions embodied therewith, the program instructions executable by a processor to cause the processor to perform operations comprising:

generating a set of via mesh specifications for a cell within an integrated circuit, each via mesh specification defining one or more straps on each layer above a first layer, which includes one or more pins that form a pin terminal, to a top layer that connects the cell to a net for interconnection of the cell with one or more other cells, and each via mesh specification also including one or more vias that interconnect adjacent ones of the layers;

verifying whether each via mesh specification in the set of via mesh specifications is a universally routable via mesh specification, the universally routable via mesh specification guaranteeing that the cell interconnects with other cells through the net while meeting all design rules; and including only the via mesh specifications of the set of via mesh specifications that are universally routable via mesh specifications in a library of via mesh specifications, wherein the library of via mesh specifications is used to finalize and fabricate the integrated circuit.

16. The computer program product according to claim 15, further comprising grouping the cell in a cell group with one or more other cells based on statistics of the cell.

17. The computer program product according to claim 16, further comprising adding the universally routable via mesh specifications obtained for the other cells of the cell group to the library of via mesh specifications.

18. The computer program product according to claim 15, wherein the verifying whether each via mesh specification is the universally routable via mesh specification includes testing whether a routing of the via mesh adheres to design requirements at each position in the cell.

19. The computer program product according to claim 18, wherein the verifying whether each via mesh specification is the universally routable via mesh specification includes testing whether a routing of adjacent copies of the via mesh adheres to the design requirements at each position.

20. The computer program product according to claim 15, further comprising assigning a pin constraint to each pin terminal, a nomenclature of the pin constraint indicating cell properties and net properties and performing timing optimization by making a selection of net properties, a source cell, and a sink cell, obtaining the pin constraint that corresponds with the net properties and the source cell or the sink cell, obtaining a corresponding universally routable via mesh specification from the library of via mesh specifications based on the nomenclature of the pin constraint, and performing timing analysis, where the timing analysis includes timing of the universally routable via mesh specification.

\* \* \* \* \*